United States Patent [19]

Gatti

[11] Patent Number: 4,791,242

[45] Date of Patent: Dec. 13, 1988

[54] ELECTRIC LINE WITH BUNDLE CONDUCTORS ASSOCIATED TO METAL OR DIELECTRIC CABLES INCORPORATING OPTIC FIBERS FOR TELECOMMUNICATION

[75] Inventor: Marco Gatti, Rome, Italy

[73] Assignee: Ente Nazionale Per L'Energia Electtrica, Rome, Italy

[21] Appl. No.: 132,313

[22] Filed: Dec. 14, 1987

[30] Foreign Application Priority Data

Dec. 19, 1986 [IT] Italy ................................ 22782 A/86

[51] Int. Cl.⁴ ............................................. H02G 7/05
[52] U.S. Cl. .................................. 174/40 R; 350/96.23
[58] Field of Search ...................... 174/40 R, 43, 70 R, 174/128 BL, 149 R, 150, 173; 248/58, 63; 350/96.23

[56] References Cited

U.S. PATENT DOCUMENTS 3,463,870 8/1969 Eucker ............................ 174/173 X
4,053,706 10/1977 Houston et al. ................ 174/149 R
4,491,387 1/1985 Dey et al. ...................... 174/70 R X Primary Examiner—Laramie E. Askin
Attorney, Agent, or Firm—Young & Thompson

[57] ABSTRACT

Line for transmitting electric energy, with bundle conductors enclosing into the bundle a metal or dielectric cable incorporating optic fibers for telecommuniation. The cable, in correspondence of each spacer of the bundle, is supported in a position placed on the vertical led through the barycenter of the bundle and at a distance from said barycenter included in a range of ±35% of the diameter of the bundle (i.e. the diameter of the circumference defined by the barycenters of the subconductors; + for positions above the barycenter, —for positions below the barycenter). The spacers are set at a mutual distance included between 30 m and 85 m. The optic fibres cable is clamped onto each spacer either by means of bolt clamps forming part of said spacer, or by means of helical armor rods wound around the optic fibres cable and around a cable positioning clamp fixedly connected to said spacer.

7 Claims, 4 Drawing Sheets

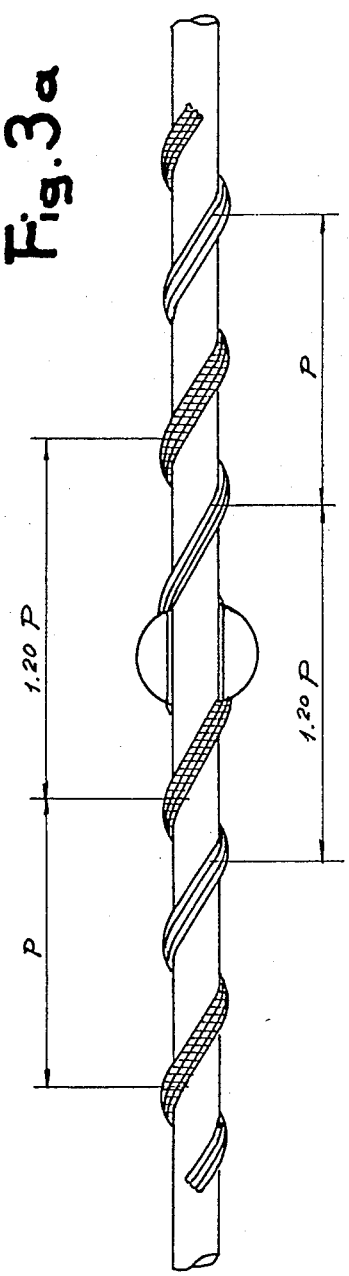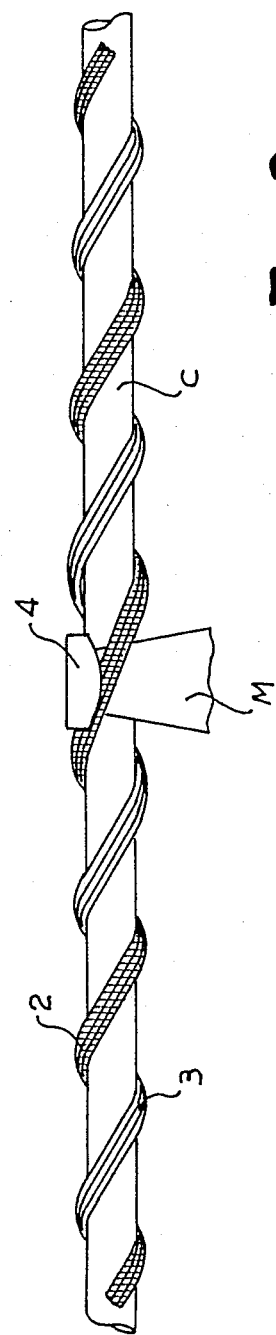

ELECTRIC LINE WITH BUNDLE CONDUCTORS ASSOCIATED TO METAL OR DIELECTRIC CABLES INCORPORATING OPTIC FIBERS FOR TELECOMMUNICATION

BACKGROUND OF THE INVENTION

1. Field of the Invention

The present invention concerns a line with bundle conductors for transmitting electric energy, to which there are associated metal or dielectric cables incorporating optic fibres for telecommunication.

2. Description of the Prior Art

In recent years, telecommunication systems using cables with optic fibres, associated to electric energy transmission systems, have been installed in various parts of the world. Most of the installations set up so far have been adopting, among the various possible solutions (ground cables and energy conductors incorporating optic cables, dielectric optic cables suspended or tied to the ground cable or to the conductors, or wound around the same, self-supported dielectric optic cables), that according to which the cable incorporating optic fibres is inserted into the ground cable of the electric line. In this case, the conventional ground cable—which, in a line for transmitting electric energy, is positioned above the conductors and is supported by the upper part of the towers or tops—is replaced by a thicker cable housing the cable incorporating optic fibres. The ground cable will thus perform both its traditional function of protecting the line against overvoltages due to atmospheric electricity, and the function of mechanical support for the optic fibres cable.

Said solution, though allowing on one hand to promptly install telecommunication lines with satisfactory performances, presents on the other hand several inconveniences, among which the following are particularly evident:

the impossibilty to equip each electric line with more than two cables incorporating optic fibres;

the heavy weight of the ground cable associated to the optic fibres cable, which makes it indispensable—in case of installation on already existing electric lines—to introduce substantial structural modifications on the line itself;

the risk that the transmission parameters of the optic fibres may be altered due to overheating of the whole cable because of the passage of short circuit currents;

the sophisticated technology of construction and assembly of the joints, which makes them particularly uneconomic.

These inconveniences reduce the overall economic advantages which could derive from associating telecommunication systems using optic fibres to the already existing electric lines.

SUMMARY OF THE INVENTION

The object of the present invention is therefore to overcome the above mentioned drawbacks and, in particular, to allow installing an optic fibres telecommunication system on an already existing electric line, without having to substantially modify the structure of said line.

According to the present invention, said object is reached in a line for transmitting electric energy and for telecommunication, of the type in which each electric conductor consists of a bundle of at least three subconductors with respective spacers, and wherein a metal or dielectric cable incorporating optic fibres for telecommunication is enclosed into at least one bundle conductor, said cable being supported by the spacers of the bundle.

BRIEF DESCRIPTION OF THE DRAWINGS

The invention will anyhow be described in further detail, with reference to a preferred embodiment thereof—applied on electric lines with three-conductor bundles—illustrated by mere way of example in the accompanying drawings, in which:

FIG. 3a is a top view showing the detail of the system for fixing the cable incorporating optic fibres onto the support of the spacer;

FIG. 3b is a side view showing the same detail of FIG. 3a; and

DESCRIPTION OF THE PREFERRED EMBODIMENTS

The arrangement of a cable incorporating optic fibres enclosed into a bundle conductor—seen that the cable is thus screened by the actual subconductors of the bundle—provides the great advantage of being able to use either a "bare" optic fibres cable (with no metal sheathing) of particularly reduced dimensions (dielectric cable), or a metal cable of considerably smaller dimensions and weight than those required for cables directly subjected to short circuit currents. On the other hand, said arrangement involves such delicate problems that the possibility of a practical realization thereof had so far not even been taken into account.

Said problems substantially consist in the need to determine a path into the bundle, for the cable incorporating optic fibres, apt to eliminate—or to at least keep within acceptable limits, in any operating conditions of the electric line—the mechanical and electric stresses imparted on said cable by the subconductors of the bundle. Such stresses may depend on widely varying conditions, as for example:

tractive efforts on the cable, due to the different thermal expansion coefficient of the subconductors of the bundle and of the cable itself;

knocks against the subconductors, due to oscillations caused by the wind;

knocks and squashings by the subconductors subjected to short circuit currents;

local electric fields having an exceedingly high value.

After accurate studies, the Applicant has been able to establish that the type of mechanical system allowing to position the cable incorporating optic fibres along the aforementioned path, is a system comprising spacers set at a mutual distance $L_1, L_2, L_3, \ldots L_n$, included between 30 m and 85 m, each spacer having an auxiliary clamp apt to support the cable in a position placed on the vertical led through the barycenter of the bundle and at a distance from said barycenter included in a range of ±35% of the diameter of the bundle (i.e. the diameter of the circumference defined by the barycenters of the subconductors; the sign ± indicating positions above and respectively below the barycenter of the bundle).

Figure 1:
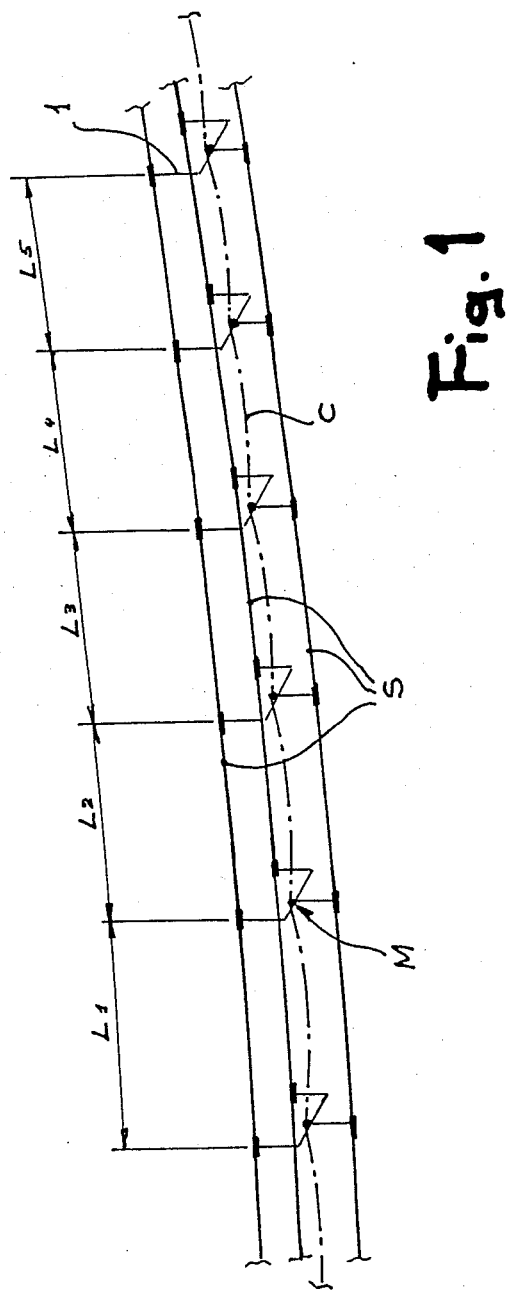
FIG. 1 is a diagrammatic perspective view of a section of a three-conductor bundle, enclosing a cable incorporating optic fibres.
Figure 2:
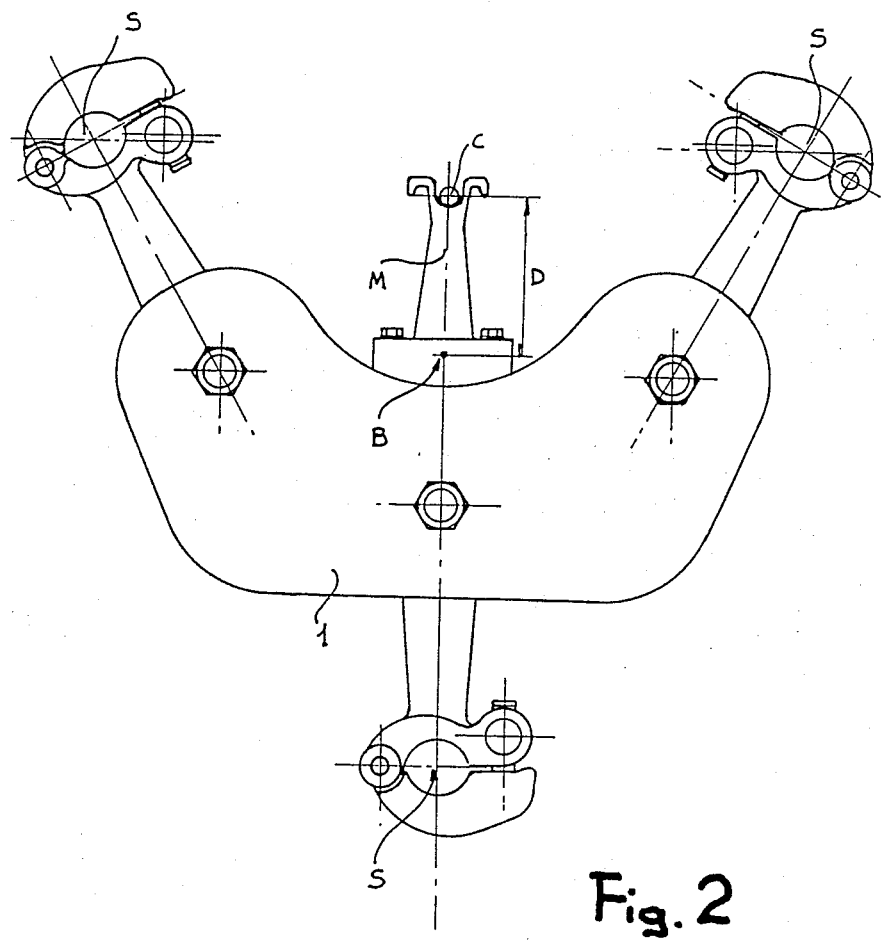
FIG. 2 is a front view of a bundle spacer comprising a support for the cable incorporating optic fibres.
Figure 4:
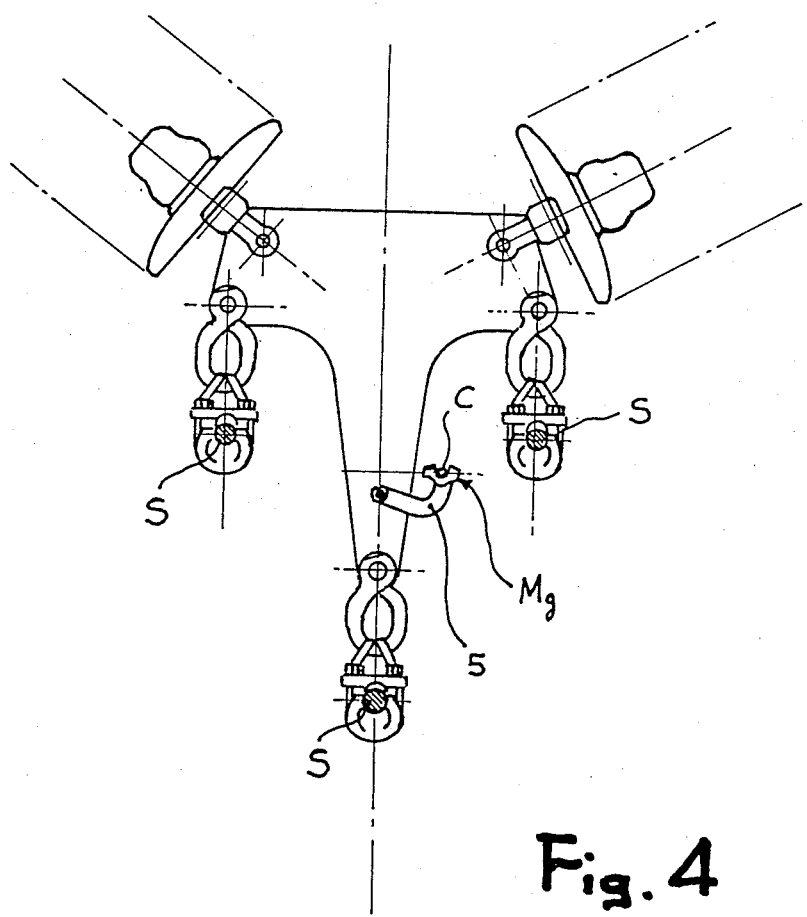
FIG. 4 is a front view showing a suspension yoke for a bundle of subconductors and the respective cable incorporating optic fibres, in correspondence of a tower.

Said arrangement is clearly illustrated in FIGS. 1 and 2. FIG. 1 is a diagram simply indicating the dislocation of the spacers 1 apt to support, in addition to the three subconductors S, also the metal or dielectric cable C incorporating optic fibres, thanks to the already specified auxiliary clamp M.

FIG. 2 shows more clearly the shape and positioning of the clamp M, which substantially forms a slackless seat for the cable C. The object of the clamp M is in fact to keep the cable C on the spacer 1 in the exact wanted position in which the distance D between the axis of the optic cable C and the barycenter B of the bundle is included in the heretofore specified range.

The perfect clamping of the cable C by the clamp M—which clamping should not determine any kind of interactions with the optic fibres housed inside the cable—is obtained either by means of a bolt device of the type used for the subconductors of the bundle (FIG. 2), or by means of a pair of armor rods 2 and 3, wound around the cable C through part of its length and anchored onto the clamp M, as shown in FIGS. 3a and 3b. Said armor rods 2 and 3 are prevented from slipping out of the clamp M by the wings 4, which extend laterally on both sides of said clamp, at the top thereof. The armor rods 2 and 3 are positioned under said wings 4 on one side and respectively on the other side of the clamp M.

The inside diameter of the helix formed by the armor rods 2 and 3 is slightly smaller than the outer diameter of the cable C, so that the armor rods are tightly wound round said cable, allowing a positive clamping thereof thanks to the friction resulting from said tightening action. The helix pitch P is sufficiently long to allow comfortably winding the armor rods round the cable C. In correspondence of the central zone of each armor rod, said pitch is about 20% longer, to allow the armor rod to wind also around the body of the clamp M.

Said arrangement allows to obtain a positive clamping of the cable C, without the same undergoing squashing or high local stresses which would be fatal for the optic fibres contained therein.

In correspondence of the suspension yokes of the bundle conductor to the towers, the cable C incorporating optic fibres is supported by an eccentric bracket 5, fixedly connected to said yokes and carrying on its free end a clamp Mg similar to the aforedescribed clamps M. Here, therefore, the optic fibres cable C is offset in respect of the barycenter of the bundle also along a horizontal direction. For the structure to work properly, said misalignment should not exceed 30% of the bundle diameter.

It is finally evident that, in correspondence of the anchorage terminals of the bundle conductors, the cable C will have to be anchored by means of anchor clamps, which can be either of the type with helical armor rods, as those described heretofore, or of the compression type, or even of the type with bolts.

From the above detailed description of the invention, it will be appreciated that the line for transmitting electric energy and for telecommunication according to the present invention has brilliantly solved all the problems connected with the known type lines for electric energy transmission and telecommunication. The possibility to use, for containing optic fibres, metal cables of considerably reduced size and weight or dielectric cables with no metal sheathing (also of very modest size and weight), allows in fact to considerably reduce the costs of the actual cable and of the respective joints, as well as to notably reduce the stresses transmitted to the towers. Thus, according to the teachings of the present invention, it will be possible to associate cables incorporating optic fibres to the already existing electric lines, without having to introduce substantial structural modifications on the actual lines.

The cables incorporating optic fibres on a same electric line can even reach a number of six (in double three-phase lines), and this number represents an undoubted advantage in respect of the two cables which can be installed according to known technique. Finally, as already said, this arrangement provides for the cable incorporating optic fibres a far better protection against overvoltages due to atmospheric electricity, than that provided by the known arrangement inside the ground cable, wherein the cable incorporating optic fibres is also subjected to any overheatings of the ground cable determined by short circuit currents.

The invention has been described with reference to a particular embodiment thereof, but it is evident that there may be various other embodiments differing from the one illustrated, within reach of ones of ordinary skill in the field and thus falling within the scope of the invention itself, which may prove necessary in order to adapt the same to different types of electric lines and to bundle conductors having more than three subconductors.

I claim:

1. Line for transmitting electric energy and for telecommunication, of the type wherein each electric conductor consists of a bundle of at least three subconductors with respective spacers, characterized in that a metal or dielectric cable incorporating optic fibres for telecommunication is enclosed into at least one bundle conductor, said cable being supported by the spacers of the bundle.

2. Line as in claim 1, wherein said spacers are set at a mutual distance included between 30 m and 85 m.

3. Line as in claim 1, wherein said cable incorporating optic fibres is supported on said spacers in a position placed on the vertical led through the barycenter of the bundle conductor and at a distance from said barycenter included in a range of ±35% of the diameter of the bundle.

4. Line as in claim 1, wherein the clamping of said cable incorporating optic fibres onto said spacers is obtained by means of a clamp forming a seat for positioning the cable, and of a pair of helical armor rods wound around the cable and the clamp top.

5. Line as in claim 1, wherein the clamping of said cable incorporating optic fibres onto said spacers is obtained by means of a clamp forming a seat for positioning the cable, said clamp being tightened onto the cable itself by means of a bolt.

6. Line as in claim 1, wherein the cable incorporating optic fibres is supported by a clamp fixed onto the free end of an eccentric bracket fixedly connected to a suspension yoke.

7. Line as in claim 6, wherein the cable incorporating optic fibres is supported on said yoke in an offset position in respect of the barycenter of a bundle conductor suspended from said suspension yoke, along a horizontal direction, said offset not exceeding 30% of the bundle diameter.

* * * * *